(12) United States Patent
Dubertret et al.

(10) Patent No.: US 9,011,715 B2
(45) Date of Patent: Apr. 21, 2015

(54) PROCESS FOR MANUFACTURING COLLOIDAL MATERIALS, COLLOIDAL MATERIALS AND THEIR USES

(75) Inventors: Benoit Dubertret, Paris (FR); Sandrine Ithurria, Paris (FR)

(73) Assignee: Nexdot, Paris (FR)

( * ) Notice: Subject to any disclaimer, the term of this patent is extended or adjusted under 35 U.S.C. 154(b) by 522 days.

(21) Appl. No.: 13/063,543

(22) PCT Filed: Sep. 10, 2009

(86) PCT No.: PCT/IB2009/053960
§ 371 (c)(1),
(2), (4) Date: Jun. 29, 2011

(87) PCT Pub. No.: WO2010/029508
PCT Pub. Date: Mar. 18, 2010

(65) Prior Publication Data
US 2011/0248222 A1    Oct. 13, 2011

Related U.S. Application Data

(60) Provisional application No. 61/095,978, filed on Sep. 11, 2008.

(30) Foreign Application Priority Data

Jan. 23, 2009  (EP) .................................... 09290048

(51) Int. Cl.
C09K 11/06 (2006.01)
C30B 7/00 (2006.01)
B01J 13/00 (2006.01)

(52) U.S. Cl.
CPC .............. *B01J 13/0026* (2013.01); *B01J 13/00* (2013.01)

(58) Field of Classification Search
CPC ......... C01B 31/02; C01G 23/04; B01J 13/00; C23C 18/16
USPC ........... 252/519.4, 512, 518.1, 519.5, 301.16; 427/64, 58, 74, 96.1, 96.2, 97.1, 99.2, 427/214, 215; 117/68, 11
See application file for complete search history.

(56) References Cited

U.S. PATENT DOCUMENTS

2003/0173541 A1    9/2003 Peng et al.
2006/0060998 A1    3/2006 Strouse et al.
2006/0130741 A1 *  6/2006 Peng et al. ...................... 117/68

FOREIGN PATENT DOCUMENTS

WO    03012006 A1    2/2003
WO    03050329 A2    6/2003

OTHER PUBLICATIONS

Sigman et al., Solventless synthesis of monodisperse Cu2S nanorods, nanodisks, and nanoplatelets, 2003, JACS, 125, 16050-16057.*
Sigman et al., Solventless Synthesis of Monodisperse Cu2S Nanorods, Nanodisks, and Nanoplatelets, J. Am. Chem. Soc. 2003, 125, 16050-16057.*
Yong et al., J. Phys. Chem. C 2007, 111, 2447-2458.*
Kigel A et al: "PbSe/PbSexS1-x core-alloyed shell nanocrystals", Materials Science and Engineering C, vol. 25, No. 5-8, Dec. 1, 2005, pp. 604-608, XP025316495.
Nose et al: "Chemical role of amines in the colloidal synthesis of CdSe quantum dots and their luminescence properties", Journal of Luminescence, vol. 126, No. 1, Apr. 26, 2007, pp. 21-26, XP022048858.
Jasinski et al: "Rapid oxidation of InP nanoparticles in air", Solid State Communications, vol. 141, No. 11, Feb. 13, 2007, pp. 624-627, XP005886216.
Takahisa Omata et al.: "Synthesis of CdSe Quantum Dots Using Micro-Flow Reactor and Their Optical Properties", Japanese Journal of Applied Physics, vol. 44, No. 1A, Jan. 11, 2005, pp. 452-456, XP002573190.
Sandrine Ithurria et al.: "Quasi 2D Colloidal CdSe Platelets with Thicknesses Controlled at the Atomic Level", J. Am. Chem. Soc., vol. 130, No. 49, Nov. 14, 2008, pp. 16504-16505, XP002573191.
International Search Report, dated Mar. 30, 2010, in PCT/IB2009/053960.

* cited by examiner

*Primary Examiner* — Monique Peets
(74) *Attorney, Agent, or Firm* — Young & Thompson

(57) ABSTRACT

A colloidal material and a process for manufacturing it and uses of the colloidal material for manufacturing optic devices. The colloidal material is of formula $A_nX_m$, wherein A is an element selected from groups II, III or IV of the periodic table; X is a metal selected from groups V or VI; and in the selection of the pair (A, X), the groups of the periodic table of A and X, respectively, are selected from the following combinations: (group II, group VI), (group III, group V) or (group IV, group VI); and n and m are such that $A_nX_m$ is a neutral compound. The colloidal compound may be CdS, InP, or PbS. The process includes a step of solution phase decomposition of a mixture of X and a carboxylate of formula $A(R-COO)_p$ in the presence of a non- or weakly-coordinating solvent, and injecting an acetate salt or acetic acid in the mixture; wherein p is an integer between 1 and 2; R is a linear or branched $C_{1-30}$alkyl group.

10 Claims, 7 Drawing Sheets

PROCESS FOR MANUFACTURING COLLOIDAL MATERIALS, COLLOIDAL MATERIALS AND THEIR USES

TECHNICAL FIELD

The present invention relates to a process for manufacturing a colloidal material, to colloidal materials obtainable by this process and to uses of said colloidal materials for the manufacture of optic devices.

The colloidal material obtainable by the process of the present invention may be for example CdS, InP, or PbS. Many other examples are given below.

The colloidal materials of the present invention may be used for example for the manufacture of lasers or optoelectronic devices. For example, according to embodiments of the present invention, the colloidal materials of the present invention may be used instead of a MBE or MOCVD semi-conductor materials.

The materials of the present invention are also useful for testing further theories of quantum confinement.

In the following text, the bracketed bolded references ([x]) are references attached to the cited documents and publication also listed in the reference listing after the <<Example>> part of the specification.

STATE OF THE ART

Nanometer size inorganic materials exhibit a wide range of electrical and optical properties that depend on composition, size, shape, and surface ligands and are of both fundamental and technological interest as disclosed in Yin, Y. et al., A. P. Colloidal nanocrystal synthesis and the organic-inorganic interface. Nature 437, 664-670 (2005) [1], in Hu, J. T. et al., C. M. Chemistry and physics in one dimension: Synthesis and properties of nanowires and nanotubes. Accounts Chem Res 32, 435-445 (1999) [2] and in Geim, A. K. et al., The rise of graphene. Nature Materials 6, 183-191 (2007) [3].

Well documented procedures to grow zero dimensional systems as disclosed in Murray, C. B. et al., M. G. Synthesis and Characterization of Nearly Monodisperse CdE (E=S, Se, Te) Semiconductor Nanocrystallites. J Am Chem Soc 115, 8706-8715 (1993) [4], dots, and one dimensional systems as disclosed in Duan, X. F. et al., C. M. General synthesis of compound semiconductor nanowires. Adv Mater 12, 298-302 (2000) [5] and Peng, X. G. et al. Shape control of CdSe nanocrystals. Nature 404, 59-61 (2000) [6], wires and tubes, as colloidal particles in solution have been reported.

In contrast, there are no methods of preparation that yield optically active two dimensional soluble particles.

Yet, ultra thin films (quantum wells) of II-VI and III-V semiconductors epitaxially grown on substrates by molecular beam epitaxy for example have proven extremely useful for both fundamental studies and a wealth of applications in optoelectronics as disclosed in Weisbuch, C. et al., Quantum Semiconductor Structures: fundamentals and applications. (Academic Press, 1991) [7].

Wires, 2D for films—can be grown in gas phase syntheses on a substrate by molecular beam epitaxy (MBE) and other techniques as disclosed in [7] or from melted clusters by vapor-liquid-solid process as disclosed in Morales, A. M. et al., C. M. A laser ablation method for the synthesis of crystalline semiconductor nanowires. Science 279, 208-211 (1998) [8]. They can also be grown in liquid phase colloidal synthesis in aqueous or non-hydrolitic media as disclosed in Jun, Y. W. et al., J. Shape control of semiconductor and metal oxide nanocrystals through nonhydrolytic colloidal routes. Angew Chem Int Edit 45, 3414-3439 (2006) [9] As for the gas phase approaches, the non hydrolytic liquid phase synthesis, gives access to 0D and 1D crystals with controlled nanometric size and shape as disclosed in reference [1], with the advantages that the crystals can be processed more easily for surface chemistry modification as disclosed in Michalet, X. et al., Quantum dots for live cells, in vivo imaging, and diagnostics. Science 307, 538-544 (2005) [10], core/shell synthesis as disclosed in Hines, M. A. et al., P. Synthesis and characterization of strongly luminescing ZnS— Capped CdSe nanocrystals. J Phys Chem-Us 100, 468-471 (1996) [11], directed assembly as disclosed in Redl, F. X. et al., S. Three-dimensional binary superlattices of magnetic nanocrystals and semiconductor quantum dots. Nature 423, 968-971 (2003) [12] or incorporation in polymer matrices or nanodevices as disclosed in Caruge, J. M., Halpert, J. E., Wood, V., Bulovic, V. & Bawendi, M. G. Colloidal quantum-dot light-emitting diodes with metal-oxide charge transport layers. Nat. Photonics 2, 247-250 (2008) [13]. Interestingly, 2D semiconductor crystals, so called quantum wells, have been synthesized only by epitaxial growth on substrate using MBE for example.

The synthesis of 2D colloidal nanocrystals, nanoplatelets or nanodisks, is limited to few examples of metal as disclosed in Puntes, V. F. et al., A. P. Synthesis of hcp-Co nanodisks. J Am Chem Soc 124, 12874-12880 (2002) [14] and in Xu, R. et al., Y. D. Single-crystal metal nanoplatelets: Cobalt, nickel, copper, and silver. Cryst. Growth Des. 7, 1904-1911 (2007) [15] and lanthanide-oxides as disclosed in Si, R., Zhang, Y. W., You, L. P. & Yan, C. H. Rare-earth oxide nanopolyhedra, nanoplates, and nanodisks. Angew Chem Int Edit 44, 3256-3260 (2005) [16] materials as well as CuS as disclosed in Sigman, M. B. et al. Solventless synthesis of monodisperse Cu2S nanorods, nanodisks, and nanoplatelets. J Am Chem Soc 125, 16050-16057 (2003) [17] and NiS as disclosed in Ghezelbash, A., Sigman, M. B. & Korgel, B. A. Solventless synthesis of nickel sulfide nanorods and triangular nanoprisms. Nano Letters 4, 537-542 (2004) [18].

The general synthesis principle of monodisperse colloidal nanocrystals is based on the separation of the nucleation and growth stages. When the seed growth is favoured in 1 direction, nanorods are obtained, and 2D crystals are formed when growth is blocked in 1 direction.

While on the paper, things look simple, practically, the synthesis of colloidal nanocrystals of any dimensionality <3 relies on subtle combination of temperature, type and concentration of precursors and ligands (or surfactant), and cannot yet be guided by a precise understanding of the fabrication process at the molecular level.

The major advances in the synthesis of colloidal semiconductor nanocrystals were obtained with CdSe, first in 1993 with the synthesis of quantum dots as disclosed in reference [4], and then in 2000 with the synthesis of nanorods as disclosed in reference [6].

But the processes disclosed in the prior art are very expensive, difficult to be carried out, do not allow an easy synthesis of the colloidal material and do not offer any possibility to obtain a controlled homogenous and reproductible thicknesses of the materials. Further, the structures of the materials obtained with the processes of the prior art are only basic ones (1, 2D), with hazardous and heterogeneous thicknesses and very irregular lateral dimensions (3D).

No prior art successfully addresses these problems.

Thus, there remains a major need of a process that satisfactorily resolves these problems and disadvantages of the prior art.

DISCLOSURE OF THE INVENTION

The present invention successfully addresses among others the above disclosed problems and disadvantages of the prior art which has failed to do.

The process of the present invention is a process for preparing a colloidal material of formula $A_nX_m$, said process comprising:

a first step of reacting together two of the three following reagents in the presence of a non- or weakly-coordinating solvent:
  reagent (i): X or a soluble form of X
  reagent (ii): R'(COOH) or an acetate salt, and
  reagent (iii): A(R—COO)p,
and
a second step of adding the third reagent into the reaction mixture obtained in the first step,
wherein
p is 1 or 2;
R is a linear or branched $C_{1-30}$ alkyl group;
R' is a linear or branched $C_{2-30}$ alkyl group; and
wherein
the choice of reagent (i), (ii) and (iii) is such that
if R is —CH3, reagent (ii) is R'(COOH) and
if R is a linear or branched $C_{2-30}$ alkyl group, reagent (ii) is an acetate salt;
and
wherein
X is a metal selected from groups V or VI of the periodic table;
A is an element selected from groups II, III or IV of the periodic table; and
A and X are selected respectively from one the following combinations: A from group II, X from group VI; or A from group III, X from group V; or A from group IV, X from group VI.

In a first example, this invention provides a process for preparing a colloidal material of formula $A_nX_m$, the process comprising a step of solution phase decomposition of a mixture of X and a carboxylate of formula $A(R—COO)_p$ in the presence of a non- or weakly-coordinating solvent, and a step of injecting an acetate salt or acetic acid in the mixture; wherein A is an element selected from groups II, III or IV of the periodic table; p is an integer between 1 and 2; R is a linear or branched $C_{1-30}$ alkyl group; X is a metal selected from groups V or VI of the periodic table; and n and m are such that $A_nX_m$ is a neutral compound; and wherein, in the selection of the pair (A, X), the groups of the periodic table of A and X, respectively, are selected from the following combinations: (group II, group VI), (group III, group V) or (group IV, group VI).

In this example, according to the present invention, the process may comprise the steps of:
  (a) providing the A carboxylate and X in a non-coordinating solvent,
  (b) degassing the mixture obtained in step (a),
  (c) heating the degassed mixture obtained in step (b) to a temperature between 100 and 280° C., preferably between 120 and 240° C., thus inducing solution phase decomposition of the mixture of A carboxylate and X, thereby producing a $A_nX_m$ colloidal material,
  (d) injecting the acetate salt or acetic acid between steps (a) and (b) or during step (b) or between steps (b) and (c) or during the heating step (c), preferably during step (c), and
  (e) recovering the $A_nX_m$ colloidal material which is in the form of platelets.

In this first example, the A carboxylate corresponds to A(R—COO)p, wherein R is a linear or branched $C_{2-30}$ alkyl group, and the acetate salt or acetic acid is respectively a salt of $CH_3COOH$ or acid acetic.

According to this example, the process of the present invention comprises a step of solution phase decomposition of a mixture of X and a carboxylate of formula $A(R—COO)_p$ as defined above in the presence of a non- or weakly-coordinating solvent.

In a second example, according to the present invention, the process may comprise the steps of:
  (a1) providing the A acetate and carboxylic acid in a non coordinating solvent
  (b1) degassing the mixture obtained in step (a1),
  (c1) heating the degassed mixture obtained in step (b1) to a temperature between 100 and 280° C., preferably between 120 and 240° C.,
  (d1) injecting X in the heated and degassed mixture of step c1, thereby producing an $A_nX_m$ colloidal material,
  (e1) recovering the $A_nX_m$ colloidal material which is in the form of platelets.

In this second example, the A acetate corresponds to A(R—COO)p, wherein R is —$CH_3$, and the carboxylic acid corresponds to R'(COOH), wherein R' is a linear or branched $C_{2-30}$ alkyl group.

In a third example, according to the present invention, the process may comprise the steps of:
  (a2) providing a carboxylic acid and X in a non coordinating solvent
  (b2) degassing the mixture obtained in step (a2),
  (c2) heating the degassed mixture obtained in step (b2) to a temperature between 100 and 280° C., preferably between 120 and 240° C.,
  (d2) injecting a A acetate in the heated and degassed mixture of step (c2), thereby producing an $A_nX_m$ colloidal material,
  (e2) recovering the $A_nX_m$ colloidal material which is in the form of platelets.

In this third example, the A acetate corresponds to A(R—COO)p, wherein R is —$CH_3$, and the carboxylic acid corresponds to R'(COOH), wherein R' is a linear or branched $C_{2-30}$ alkyl group.

In a fourth example, according to the present invention, the process may comprise the steps of
  (a3) providing the A acetate and X in a non-coordinating solvent,
  (b3) degassing the mixture obtained in step (a3),
  (c3) heating the degassed mixture obtained in step (b3) to a temperature between 100 and 280° C., preferably between 120 and 240° C.,
  (d3) injecting the carboxylic acid between steps (a3) and (b3) or during step (b3) or between steps (b3) and (c3) or during the heating step (c3), preferably during step (c3), producing an $A_nX_m$ colloidal material, and
  (e3) recovering the $A_nX_m$ colloidal material which is in the form of platelets.

In this fourth example, the A acetate corresponds to A(R—COO)p, wherein R is —$CH_3$, and the carboxylic acid corresponds to R'(COOH), wherein R' is a linear or branched $C_{2-30}$ alkyl group.

In the present invention, <<periodic table>> refers to the Mendeleiev Periodic Table of the elements.

In the present invention, a <<weakly coordinating solvent>> is a solvent like octadecene which is not a coordinating solvent of metals or semi-conductors. However, the present inventors have noted that the presence of a double bond in a long alkyl chain generates a low complexation of ODE (Octadecene) to the surface of the prepared nanoparticles. According to the present invention, the non-coordinating solvent may be for example octadecene, dichloromethane, tetrahydrofurane (THF), trioctylamine, octadecanal, diesel, oil.

According to the present invention, in $A(R-COO)_p$, R is a linear or branched $C_{1-30}$alkyl group, preferably a linear or branched $C_{1-20}$alkyl group, most preferably a linear or branched $C_{4-18}$alkyl group. For example, the <<$C_1$-$C_{30}$ alkyl-COOH>> may be melissic acid, octacosanoic acid, decanoic acid, undecanoic acid, myristic acid, oleic acid, acetic acid, propionic acid, butyric acid or a mixture thereof.

According to the present invention, the carboxylate $R-COO^-$ of reagent (iii), i.e. of $A(R-COO)_p$, may be selected from any carboxylate ions of the above carboxylic acids, for example, from the group comprising acetate, laurate, myristate, palmitate, stearate or a mixture thereof.

For example, the carboxylic acid of step (a1) or (a2) or (d3) may be selected from the group comprising melissic acid, octacosanoic acid, decanoic acid, undecanoic acid, myristic acid, oleic acid, acetic acid, propionic acid, butyric acid or a mixture thereof.

According to the present invention, in R'(COOH) of reagent (ii), R' may be a linear or branched $C_{2-30}$ alkyl group. For example, it may be selected from any carboxylate ions of the above carboxylic acids, for example from the group comprising laurate, myristate, palmitate, stearate or a mixture thereof.

According to the present invention, the acetate salt of reagent (ii) may be a metal acetate salt and/or the acetate salt may be an hydrate or not.

According to the present invention, when in reagent (ii) the acetate salt is a metal acetate salt, the metal, i.e. A, may be selected for example from the group comprising Cd, Mn, Zn, Mg, Co, Na, In or K or a mixture thereof.

According to the present invention, for example, the acetate salt may be selected, for example, from the group comprising cadmium acetate dihydrate, $Mn(Ac)_2,4H_2O$, $Zn(Ac)_2$, $Mg(Ac)_2,4H_2O$, $Co(Ac)_2,4H_2O$ or NaAc or a mixture thereof.

According to the present invention, X or a soluble form of X is used in the process. X is a metal selected from groups V or VI of the periodic table. For example, X may be selected form the group comprising Se, Te, S, P, As and Sb or a mixture thereof. When X is in a soluble form, for example in step (d1), it may be solubilized with a solvent selected from the group comprising trioctylphosphine (TOP), tributylphosphine (TBP) and octadécène (ODE), for example TOP or TBP or ODE Te or TOP or TBP or ODE Se when X is Te or Se respectively.

For example for Se, $CH_4N_2Se$ (selenourea) may also be used.

In the process of the present invention, the first step, for example step (a) or (a1) or (a2) or (a3), is a mixing step. It may be carried out at any suitable temperature allowing the mixture of the carboxylate and X in the non-coordinating solvent. For example, the first step, for example step (a) or (a1) or (a2) or (a3), may be carried out at room temperature, e.g. at a temperature below the boiling temperature of the non coordinating solvent, generally at a temperature from 5 to 100° C., for example from 5 to 90° C., for example from 5 to 60° C., for example from 70 to 90° C., for example at a temperature from 10 to 90° C., for example from 10 to 45° C., preferably from 20 to 30° C.

According to the present invention, the process of the present invention may also comprise a degassing step. This degassing step, for example degassing step (b) or (b1) or (b2) or (b3), may be carried out at a pressure below the atmospheric pressure by any means known by the skilled person in the art. This step may be carried out for example at a pressure of from 10 to below $10^5$ Pa. Preferably the degassing step, for example, (b) or (b1) or (b2) or (b3), is carried out until vacuum. The degassing step, for example (b) or (b1) or (b2) or (b3), may be carried out at the same temperature as step (a) or (a1) or (a2) or (a3) respectively, or at a different temperature. For example, the degassing step may be carried out at a temperature of from 20° C. to 90° C. For example for Cd $(Ac)_2$, degassed or not, the temperature may be from 70° C. to 90° C., for example at 80° C.

According to the present invention, the second step is preferably carried out with an heating of the mixture. The heating step, for example (c) (c1) or (c2) or (c3), may be carried out at any temperature allowing solution phase decomposition of the mixture, for example, in step (c) of X and the carboxylate $A(R-COO)_p$. For example, the heating step may be carried out at a temperature from 100 to 300° C., for example from 140° to 260° C.

According to the present invention, the second step, also called heating step, for example step (c) or (c1) or (c2) or (c3), is preferably carried out under inert atmosphere. Inert atmosphere may be nitrogen, or any other inert gas known by the skilled person.

According to the present invention, the heating step, for example (c) or (c1d1) or (c2d2) or (c3), may carried out during any suitable time period allowing a solution phase decomposition, for example of the mixture of X and carboxylate $A(R-COO)_p$. Preferably the heating step is carried out during a time period ranging from 1 minute to 1 hour, preferably from 1 minute to 30 minutes.

According to the present invention, the process of the present invention may also comprise a recovering step, for example the recovering step (e) or (e1) or (e2) or (e3). This step may be carried after precipitation of the $A_nX_m$ colloidal material obtained in step (c), respectively (c1) or (c2) or (c3). This recovering step may be carried out by any suitable method known by the skilled person, preferably by alcool precipitation. When alcool precipitation is used, the alcool used may be selected, for example from the group comprising methanol, ethanol, propanol or butanol.

Other method include differential precipitations. For example at the end of the synthesis, oleic acid and hexane may be introduced at room temperature, for example at a temperature of from 15 to 30° C. Polyhedral QDs are soluble in a mixture of hexane and oleic acid, whereas platelets precipitate upon centrifugation. In an other example, the synthesis product may be precipitated with addition of ethanol. After centrifugation, the precipitate may suspended in tetrahydrofuran (THF). Hexane and/or ethanol may be added, for example slowly, until a slightly cloudy mixture is obtained. Centrifugation allows the separation of platelets from QDs. See reference [4] for a detailed description of size selective precipitation.

According to the present invention, the $A_nX_m$ colloidal material recovered at the end of the process of the present invention, for example in step (d) or (d1) or (d2) or (d3), is preferably suspended in a solvent which does not react with the $A_nX_m$ colloidal material, for example heptane or hexane, tétrahydrofurane or tétrachloroethylène. Any other equivalent solvent that does not react with the recovered colloidal material may be used.

Any suitable concentrations of reagents (i), (ii) and (iii) may be used as long as the chemical reaction occurs.

For example the molar proportions of A and X may be from 1:100 to 100:1, for example 1:50 to 50:1, for example 6:1 to 2:1.

Preferably, in the process of the present invention the molar proportion of reagent (ii) and (iii) may be from 1:1000 to 1000:1, for example 1:50 to 50:1, for example from 1:6 to 6:1, for example 1:1.

For example, according to the present invention, the solution phase decomposition of the mixture of A carboxylate and X is preferably carried out with molar proportions of the carboxylate $A(R-COO)_p$ and X, i.e. A/X of between 1:99 and 99:1, for example between 20:80 and 80:20, for example between 40:60 and 60:40, for example between 45:55 and 55:45. For example, the solution phase decomposition of the mixture of carboxylate $A(R-COO)_p$ and X may be carried out with equimolar or substantially equimolar proportions of A and X or not. Preferably, the molar proportions are from 1A:1X to 6A:1X.

In the present invention, <<substantially equimolar>> means substantially stoechiomeric quantities of A and X in the chemical reaction for the preparation of $A_nX_m$ according to the process of the present invention. For example from 0.01 mmole to 100 mmoles of A and from 0.01 mmole to 100 mmoles of X.

According to the present invention, for example, the solution phase decomposition of the mixture of A carboxylate and X may be carried out with equimolar or substantially equimolar proportions of each of A carboxylate, X and acetate salt.

According to the present invention, in the first above example, the acetate salt is preferably added during heating step (c) when an orange color is observed in the heated mixture. In other words, step (d) is preferably carried out during heating step (c). The introduction during the heating step gives access to platelet population thicker than when the acetate salt is introduced at the beginning of the reaction.

According to the present invention, the acetate salt is preferably added during the heating step, for example heating step (c) or (d2), when the temperature reaches at least 100° C., for example 180° C., for example 195° C. Indeed, injection at high temperature gives access to a wider range of platelet thicknesses.

According to a specific embodiment, the process of the present invention further comprises a step of adding an unsaturated fatty acid, for example between heating step (c) or (c1) or (c2) or (c3) and recovering step (e) or (e1) or (e2) or (e3) respectively. This step permits a better separation between the polyhedral QDs (QDs means "quantum dots") and the platelet shaped QDs, after synthesis.

The process of the present invention allows the manufacture of a colloidal material of formula $A_nX_m$, wherein $A_nX_m$ is as defined above. For example, the present invention is particularly suitable for the manufacture a colloidal material selected from the group consisting of CdSe, CdTe, CdS, InP, $CuInSe$, $CuInS_2$, PbSe, PbS, InAs, InSb.

For example, the process of the present invention allows the manufacture of CdSe. In this example, the process may comprise, for example, the step of solution phase decomposition of a mixture of a cadmium carboxylate as defined above and selenium in the presence of the non- or weakly coordinating solvent and an acetate salt as defined above too.

According to the present invention, selenium is preferably provided in a form selected from the group comprising Se mesh form, sonicated selenium mesh form, Se dissolved in octadecene, in trioctylphosphine, tributylphosphine, alkyl ammonium selenocarbamate, Selenourea, or an other weakly coordinating solvent. Indeed, any form of reacting Se precursor can be used as a Se source.

According to a particular embodiment of the present invention, an additional carboxylate may be added during the process of the present invention, for example of formula $R''-COO^-$. This unsaturated fatty acid may be added or injected for example in the mixture of the first or second step. For example:

between steps (a) or (a1) or (a2) or (a3) and (b) or (b1) or (b2) or (b3), or
during step (b) or (b1) or (b2) or (b3), or
between steps (b) or (b1) or (b2) or (b3) and (c) or (c1) or (c2) or (c3), or
during the heating step (c) or (c1) or (c2) or (c3),
preferably during step (c) or (c1) or (c2) or (c3),
wherein, preferably, R" is identical or different from R and/or R', and wherein R" is a linear or branched C1-30alkyl group, preferably a linear or branched C1-20alkyl group, most preferably a linear or branched C4-18alkyl group. For example, these alkyl groups may be as defined in the above description, i.e. selected, independently from R and/or from R', in the group comprising acetate, laurate, myristate, palmitate, stearate or a mixture thereof.

According to this particular embodiment, said carboxylate is preferably injected in an excess molar amount of from 0.1 to 1000% with regard to the quantity of the acetate salt.

According to a particular embodiment, the process of the present invention may comprise an additional step of lateral growth of the colloidal material of formula $A_nX_m$, when said material is in the form of platelets. This means that once the platelets are synthesized, they undergo lateral growth.

This post-synthetic lateral growth may take place in solution. In this case, the platelets may be directly recuperated after their synthesis and placed in suitable conditions for lateral growth. At the end of the synthesis, nanoplatelets may be redispersed in a solvent for example hexane, toluene, THF at a concentration of for example between 1M and 0.2M, for example between 500 μM and 100 μM, for example between 50 μM and 10 nM. A part of this solution, for example 10 ml, for example 5 ml, for example 2 ml are placed in a suitable flask, for example in a three neck flask, with 5 ml, 3 ml or 2 ml of a non- or weakly-coordinating solvent for example octadecene and/or trioctylamine.

The flask containing the nanoplatelets may be degassed under vacuum generally at a temperature from 5 to 100° C., for example from 5 to 90° C., for example from 5 to 60° C., for example from 70 to 90° C., for example at a temperature from 10 to 90° C., for example from 10 to 45° C., preferably from 20 to 30° C.

A precursor of acetate, a precursor of A and a precursor X are next added to the platelets in order to trigger the lateral growth of the platelets.

These precursors may all be introduced at once in the mixture containing the platelets, for example by introducing them directly in the flask. The flask may then by degassed under vacuum, at a temperature of between 20° C. and 100° C., for example between 30° C. and 80° C. The flask may subsequently be put under an inert atmosphere, for example Argon flow, at a temperature of between 80° C. and 240° C., for example between 140° C. and 200° C.

In another variant the precursor of acetate and a part of precursor of A are introduced in the mixture containing the platelets, for example in a flask. The flask may then by degassed under vacuum, at a temperature of between 20° C. and 100° C., for example between 30° C. and 80° C., and subsequently put under an inert atmosphere, for example Argon flow, at a temperature of between 80° C. and 240° C., for example between 140° C. and 200° C. Precursor X and the rest of precursor A may then be added to the flask.

Precursors A and X may be introduced as a mixture, optionally in a suitable solvent, for example octadecene and/or trioctylamine. A and X are as previously defined.

The rate of introduction of precursors A and X, for example by injection, may be for example between 10 ml/h and 5 ml/h, for example between 2 ml/h and 0.5 ml/h, for example between 0.1 ml/h and 0.01 ml/h.

The precursor of acetate may be an acetate salt. The acetate salt may be selected, for example, from a group comprising cadmium acetate dihydrate, $Mn(Ac)_2,4H_2O$, $Zn(Ac)_2$, $Mg(Ac)_2,4H_2O$, $Co(Ac)_2,4H_2O$ or NaAc or a mixture thereof.

The molar proportions of precursors A and X in the final mixture may be from 1:100 to 100:1, for example from 1:50 to 50:1, for example 1:2 to 2:1.

The molar proportions of acetate salt and precursor A in the final mixture may be from 1:100 to 100:1, for example 1:50 to 50:1, for example 1:2 to 2:1.

According to the present invention the precursor of A may be a carboxylate $A(R\text{---}COO)_p$, as previously defined, or a mixture thereof.

The post-synthetic lateral growth may also be realized on a substrate. In this case, the lateral growth of the platelets may be realized on substrates having important dimensions, for example dimensions between 1 mm$^2$ and 1 m$^2$. In the context of the invention, by substrate it is meant any material, solid or liquid, flexible or rigid, suitable for use in semiconductors, laser, photovoltaic cells, diodes, Light-Emitting Diode (LED) and on which platelets can grow laterally. The substrate may be isotropic or composite. The substrate may be selected in a group comprising glass, quartz, mica, silicon, germanium, silicon carbide, tin-indium oxide, titanium oxide, aluminum oxide, iron oxide, titanium, zinc, magnesium, niobium, copper, platinum, iron, aluminum, silver, platinum etc. The substrate may also be chosen among flexible materials such as plastic or flexible polymers. In this case, once the platelets are synthesized, they are applied on the desired substrate for example by hydrophobic interactions, by sol-gel technology, by deep-coating, by spin-coating [32] etc.

The platelets may be deposited on the substrate in the form of a uniform film. The thickness of the film may be regulated depending on its use. For example, films with thicknesses below 10 nm may be obtained.

The lateral growth rate may be regulated by varying the growth temperature, the rate at which the precursors are introduced for example by injection, and the amount of platelets elongated.

Example 7 and FIGS. 8 and 9 illustrate this particular embodiment.

The present invention relates therefore also to a $A_nX_m$ colloidal material obtainable by the process of the present invention. This has been observed experimentally as shown below.

According to the present invention, the colloidal material may be in the form of nanoplatelets and/or nanocrystals. This has been observed experimentally as shown below. The present inventors demonstrate here, for example, that quasi-2D $A_nX_m$ platelets, for example quasi-2D CdSe platelets, can be synthesized with different thicknesses quantified by a $A_nX_m$ monolayer, for example a CdSe monolayer.

According to the present invention, the colloidal material may be a quasi 2D semiconductor crystals. This has been observed experimentally as shown below.

According to the present invention, the $A_nX_m$ colloidal material of the present invention may be selected from the group comprising a II-VI, IV-VI or III-V semiconductor crystal. For example, the material may be CdSe. For example, The present inventors show for the very first time that II-VI cadmium selenide platelets, with thicknesses tuned at the atomic level, can be synthesized in solution.

For example, the CdSe colloidal material may have lateral sizes of between 10 and a few hundred nanometers (for example between 10 and 500 nm, for example between 10 and 200 nm, for example between 5 and 40 nm). In the present invention, <<lateral sizes>> are the sizes other than the thinnest thickness of the platelets. In other words, the "lateral sizes" of the platelets are the length and/or the width of the platelets. An illustration of this definition is provided in annexed FIG. 4.

In the example of CdSe, the process of the present invention allows to obtain a colloidal material having a thickness less or equal to 10 nm.

The CdSe colloidal material obtained by the process of the present invention presents at least one fluorescent emission at 460-465 nm, 510 nm or 550 nm. The present inventors believe that these particular properties reveal an unexpected effect due to the present invention.

The present invention relates also to a nanoparticular material consisting in a $A_nX_m$ colloidal material, for example any one of those above defined, for example a CdSe colloidal material, according to the present invention.

According to a particular embodiment of the invention, when the colloidal material obtainable by the process of the present invention is in the form of nanoplatelets, the lateral dimensions, that is the length and the width, of said platelets may be extended further after their synthesis.

When the lateral growth of the platelets takes place in solution, this leads to a material that may have lateral sizes for example between 10 nm to a few meters, for example 10 nm to 100 mm, for example from 100 nm to 100 micron, for example from 100 nm to 10 micron.

As indicated before, the lateral growth of the platelets may be realized on substrates having important dimensions, for example dimensions of between 1 mm$^2$ and 1 m$^2$. In this case, the platelets may be deposited on the substrate for example, in the form of a uniform film. The thickness of the film may be regulated depending on its final application. For example, films with thicknesses below 10 nm may be obtained.

The colloidal material $A_nX_m$ of the present invention, may be used, for example, for the manufacture of a laser and/or instead of a MBE or a MOCVD semi-conductor material.

The material $A_nX_m$ of the present invention may also be used for the manufacture of or in an optoelectronic device, for example a laser, a photovoltaic cell or a diode.

For example for the diodes applications, see J. M. Caruge, J. E. Halpert, V. Wood, V. Bulovic, M. G. Bawendi, Nat. Photonics 2, 247 (April, 2008) [13], wherein the material of the present invention may advantageously be used. For example for the photovoltaic applications, see Y. Wu, C. Wadia, W. L. Ma, B. Sadtler, A. P. Alivisatos, Nano Letters 8, 2551 (August, 2008) [31], wherein the material of the present invention may advantageously be used. For example for the laser application, see J. Faist, F. Capasso, D. L. Sivco et al., Science 264 (5158), 553 (1994) [29], wherein the material of the present invention may advantageously be used.

Accordingly, the present invention relates also to an optoelectronic device comprising a material according to the present invention.

Accordingly, the present invention relates also to a laser, a photovoltaic cell, a Light-Emitting Diode (LED) or a diode comprising a material according to the present invention.

The present inventors disclose here a method for the preparation of these new colloidal nanocrystals and characterize them structurally and optically.

As discloses herein, in the example of CdSe, they identified three platelets populations with emission maximum at 462 nm, 513 nm and 550 nm with corresponding thicknesses estimated at 1.9 nm, 2.2 nm and 2.5 nm respectively. Despite the fact that the platelets aspect ratio within a population can range from 4 to several hundreds, the emission spectra full width half maximum (FWHM) of each population is <10 nm at room temperature with quantum yields that can reach 30%.

The platelets that the present inventors have synthesized are an extension of the quantum wells epitaxially grown on substrates, with the advantages that they can be easily synthesized in solution at low cost and used as building blocks for more advanced structures, have uniform thickness that can be tuned within one CdSe monolayer, and finite lateral dimensions ranging for example from 10 nm to few 100 nm.

Another interesting feature of the materials of the present invention, for example these platelets, is their very narrow FWHM at room temperature. These lead to interesting applications like for example the synthesis of beads with an optical bar codes as disclosed in Han, M. Y. et al., S. Quantum-dot-tagged microbeads for multiplexed optical coding of biomolecules. Nat Biotechnol 19, 631-635 (2001) [30]. In this application, the material of the present invention may replace the material disclosed in this document. The emission of these platelets should be polarized as in the case of quantum wells. Some applications may also benefit from this property.

This invention is further illustrated by the following examples with regard to the annexed drawings that should not be construed as limiting.

EXAMPLES

Example 1

Manufacture of a CdSe Material According to the Present Invention

All chemicals were purchased from Sigma Aldrich and used without further modifications. Fluorescence emission and excitation spectra were recorded on a Jobin Yvon Fluoromax 3.

Absorption spectra were recorded on a Varian Cary 50 Probe UV-Vis spectrometer. source.TEM images were acquired on a TEM JEOL 2010 with field electron gun. Powder X-ray Diffraction (PXRD) experiments were realized with a Philips X'Pert diffractometer with Cu Kα source.

The nanoplatelets synthesis in this example is based on the solution phase decomposition of Cadmium myristate and Selenium mesh precursors in the presence of a non coordinating solvent and an acetate salt.

In this experiment, 170 mg (0.3 mmol) (85 mg (0.15 mmol)) of cadmium myristate, and 12 mg (0.15 mmol) of Se mesh were mixed in 15 ml of octadecene in a three neck flask and degassed under vacuum for 10 minutes. The mixture was then heated at 240° C. under Argon.

When the temperature reached 195° C. (the solution is orange), 55 mg (0.3 mmol) of Zinc acetate (40 mg (0.15 mmol) of cadmium acetate dehydrate) was swiftly introduced in the flask.

After 10 min at 240° C., the reaction was stopped by removal of the heating mantle.

The particles synthesized were isolated by ethanol precipitation and suspended in hexane.

Platelets were separated from polyhedral quantum dots by butanol precipitation and resuspended in hexane.

Figure 1:
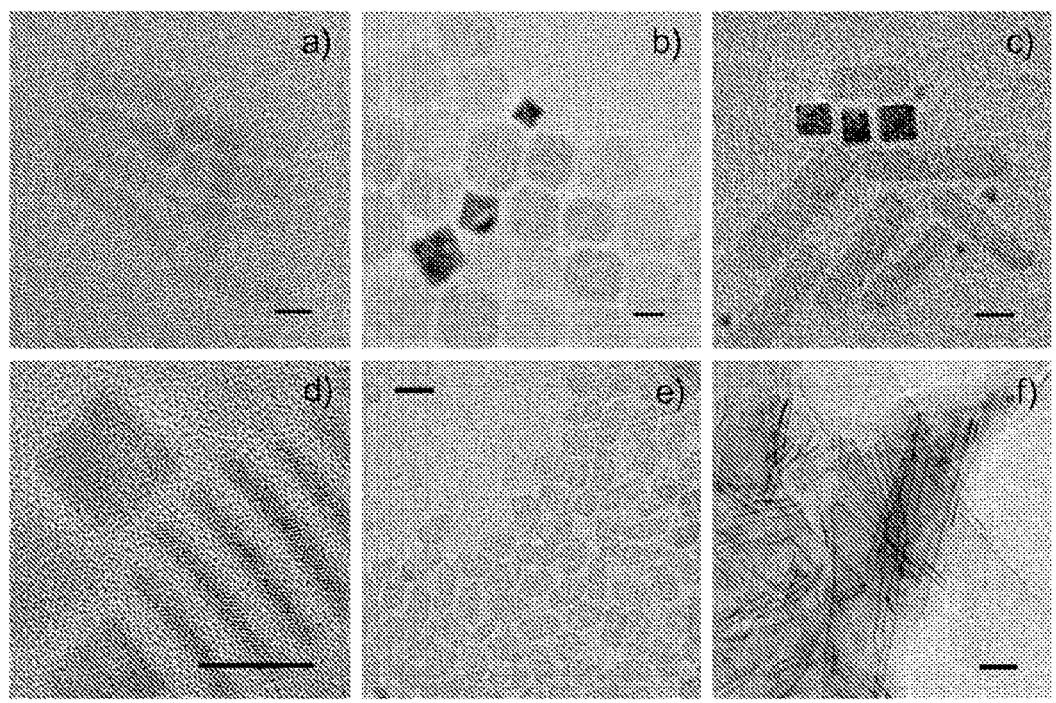
FIG. 1: Transmission Electron Microscopy (TEM) images of CdSe Colloidal platelets nanocrystals synthesized with different methods. a) injection of Zinc acetate (cadmium acetate) at 195° C. and heating at 240° C. for 10 min. b) and c) injection of a big quantity of Cd(Ac)$_2$ at 195° C. and heating at 240° C. for 20 min (same as in a) with a second precursor injection at 240° C. and heating for 20 min; d) High resolution TEM of b). e) same as a) using manganese acetate in place of cadmium acetate. f) Cadmium acetate is injected at room temperature with the other precursors prior to heating. Scale bars: (a-d): 10 nm, (e, f): 20 nm.

TEM (TEM JOEL 2010 with field electron gun) observations of the nanoparticles (see annexed FIG. 1a) demonstrate the formation of CdSe platelets with lateral dimensions from 6 nm to 40 nm.

Figure 6:
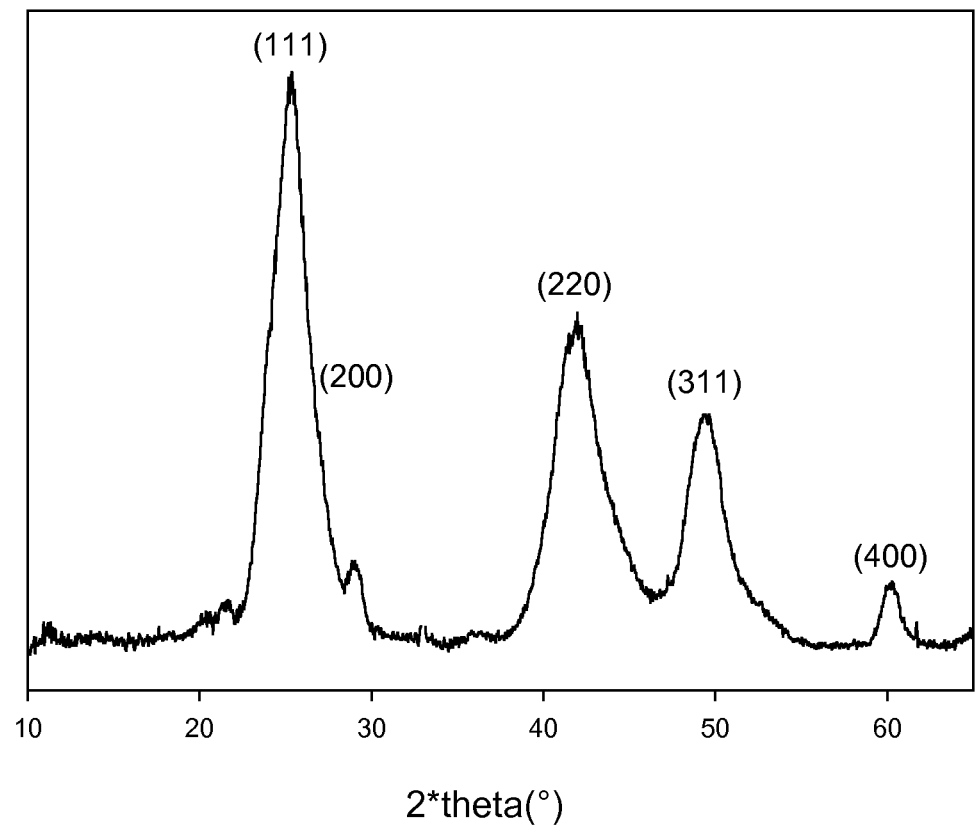
FIG. 6: XRD pattern of CdSe platelets emitting at 510 nm. The standard diffraction peak position of ZB CdSe are indicated.

The platelets have a zinc-blend crystal structure (FIG. 6) which is consistent with the zinc-blend formation of CdSe polyhedra when the same syntheses are used without acetate salt as disclosed in Yang, Y. A. et al., Synthesis of CdSe and CdTe nanocrystals without precursor injection. Angew Chem Int Edit 44, 6712-6715 (2005) [19].

Figure 7:
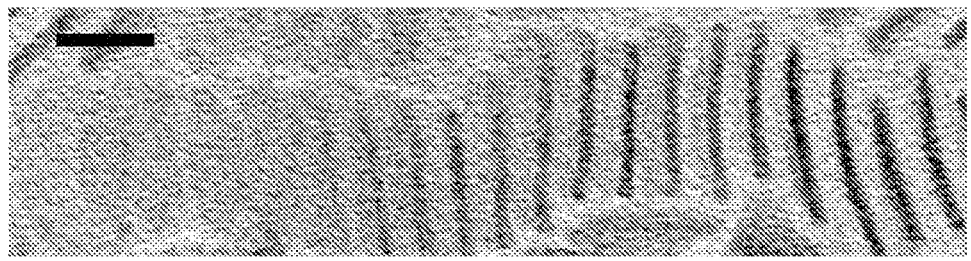
FIG. 7: Transmission Electron Microscopy (TEM) images of CdSe colloidal platelets nanocrystals. The platelets are on their edge on the right hand side of the picture and fall like dominos on their face as we shift to the left of the image (Scale bar 10 nm)
Figure 8:
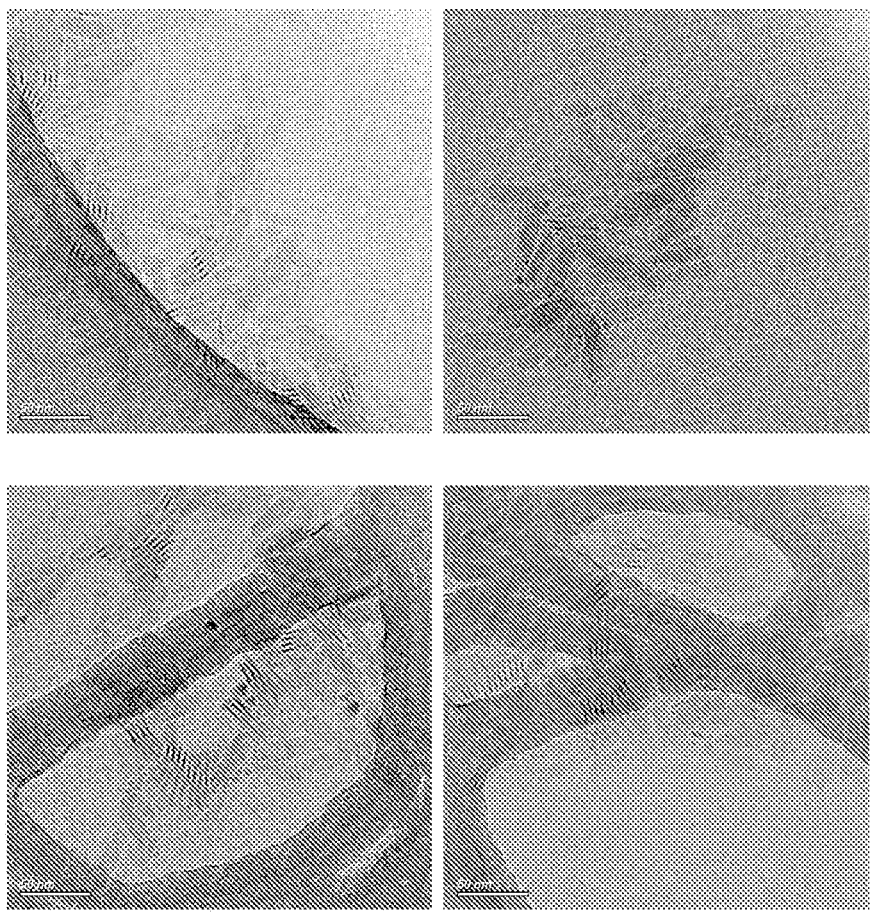
FIG. 8: Transmission Electron Microscopy (TEM) images of CdSe colloidal platelets before lateral growth (example 7) (scale bar 50 nm).
Figure 9:
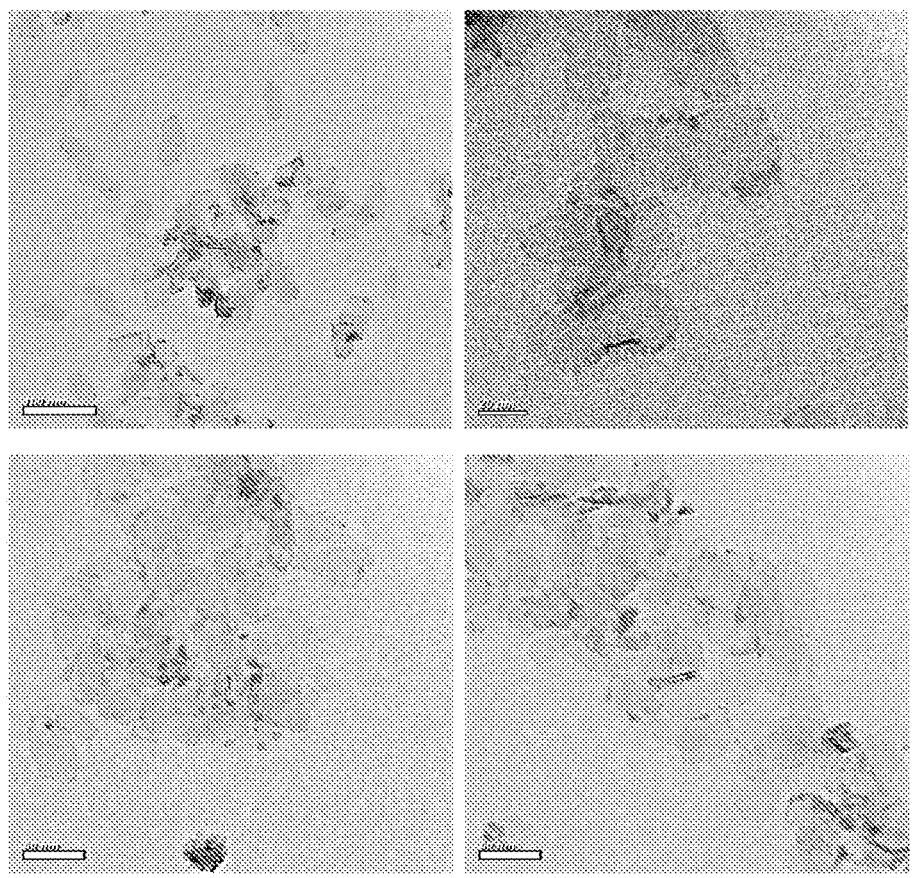
FIG. 9: Transmission Electron Microscopy (TEM) images of CdSe colloidal platelets after lateral growth (example 7) (scale bar 50 nm).

The platelet thickness can be measured when they stack on their edge (FIG. 1d and FIG. 7) and is found to be around 2.2±0.3 nm.

Using TEM images, no difference in the platelet thicknesses could be observed. However, as can be seen on FIG. 1b, when platelets lay flat on the TEM grid, different grey levels are distinguishable, suggesting the synthesis of platelets of different thicknesses.

The platelet formation is induced by the presence of acetate salt in the reaction medium.

Example 2

Manufacture of a CdSe Material According to Example 1 with Different Acetate Salts Other acetate salts have been tested in this example. The experiments were carried out as disclosed in example 1, but the acetate salt used in example 1 has been replaced in different experiments successively by $Mn(Ac)_2,4H_2O$; $Zn(Ac)_2$; $Mg(Ac)_2,4H_2O$; $Co(Ac)_2,4H_2O$, $Na(Ac)$ or no alternative acetate salt.

These experiments show that the process allows the formation of CdSe platelets, with somewhat different geometries.

In all cases, despite the presence of other metallic ions, elementary analysis indicates that after the washing step, the platelets crystals contained only cadmium and selenium.

When the acetate salt is introduced at the beginning of the synthesis, large CdSe quasi 2D films are obtained (FIG. 1f). These films lateral dimensions can reach the micron and they can fold in rolls or in sheets. Most of them are not soluble in solvents.

When the acetate salt is introduced after the formation of the CdSe crystal seeds, smaller CdSe platelets with square or rectangular shape or more complex, faceted planes (FIG. 1a-e) can be obtained.

When no acetate salt is introduced, only polyhedral CdSe quantum dots are obtained.

The inventors have further noted that the shape, aspect ratio, thickness of the platelets can be systematically controlled by varying the reaction time, the injection and growth temperature and the ratios between the cadmium oleate, the acetate salt, and the selenium.

Example 3

Study of the Material of the Present Invention

Figure 2:
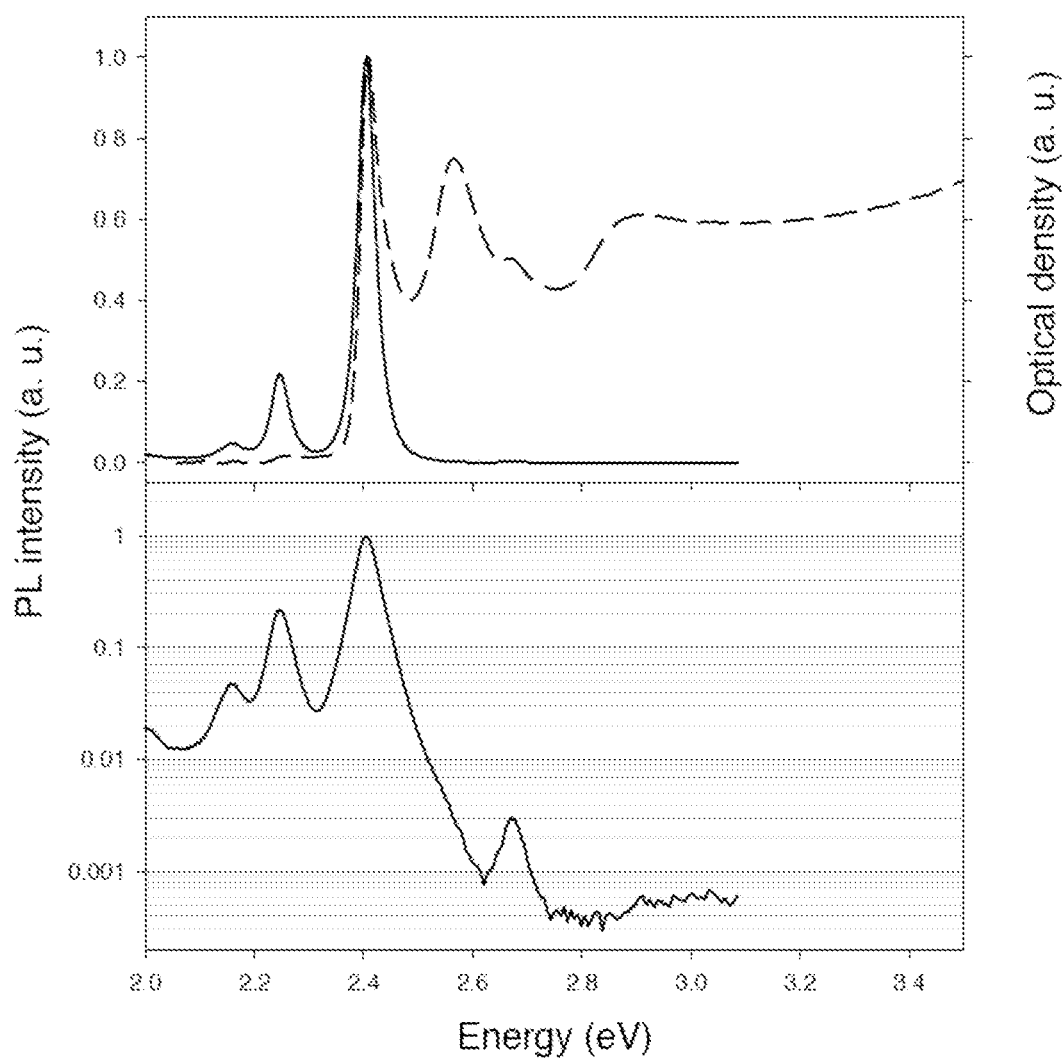
FIG. 2: a) Emission and absorption spectra of a platelet solution in hexane. The sample correspond to TEM of FIG. 1e). The platelets were isolated from the reaction solution with one ethanol precipitation. b) The same fluorescence emission spectra as in a) plotted in log/linear scale.

The inventors studied the optical properties of the platelets synthesized at room temperature. The emission spectra of the whole solution after the washing step and resuspension in hexane (TEM of FIG. 1a) was measured in a fluorometer Fluoromax 3 Jobin Yvon™ (see FIG. 2).

The first remarkable feature is that the main fluorescent emission peak, with an emission maximum at 513 nm has a full width half maximum of 41 meV, i.e. 8 nm. Quantum dots or quantum rods emitting around 500 nm usually have FWHM between 25 nm and 35 nm, depending on the synthesis. Such narrow FWHM suggests that the nanoparticles emitting at this wavelength are extremely homogeneous in size, at least in the direction responsible for this emission.

The other remarkable feature of the emission spectra (FIG. 2b) is the presence in the solution of four populations (noted hereafter population 1-4) with respective fluorescence maxima at 2.68 eV, 2.42 eV, 2.25 eV, 2.17 eV. The FWHM of populations 1-3 is 41 meV, which is 1.6 $k_B T$ at 300K.

All the CdSe platelet syntheses the inventors have tested so far produce fluorescent populations that emit with maxima exactly at 2.68±0.01 eV, 2.42±0.01 eV, and 2.25±0.01 eV.

Depending on the synthesis conditions, one population or the other can be obtained in large excess compared to the other, and size selective precipitation can be used to further isolate the sub-populations[4].

Usually, the platelet population emitting at higher energy are less soluble in hexane than the other.

The very narrow FWHM measured in spite of the large lateral platelets size variations observed in TEM images (FIG. 1) implies that the platelet aspect ratio has only little influence on their emission wavelength.

The major difference between the platelets population seems to be their thickness.

Interestingly, both the emission and the absorption spectra of the platelets (FIG. 2a) can easily be interpreted using the model of infinite one-dimensional potential quantum wells. In this framework, the absorption coefficient has a step-like structure [7] with each step at the threshold energy for the $n^{th}$ transition between the heavy hole and the electron:

$$\hbar w_n = E_g + E_{hhn} + E_{en} = E_g + \hbar^2 n^2 p^2 / 2 m_{hh}^* d^2 + \hbar^2 n^2 p^2 / 2 m_e^* d^2$$

(Eq. 1) and the luminescence spectrum consist of a peak of spectral width $\sim k_B T$ at energy $\hbar w = E_g + E_{hh1} + E_{e1}$, where $E_g$ is the semiconductor bandgap, n is the number of the interband transition, $m_{hh}^*$ and $m_e^*$ the heavy hole and electron effective mass, and d is the thickness of the quantum well.

Figure 3:
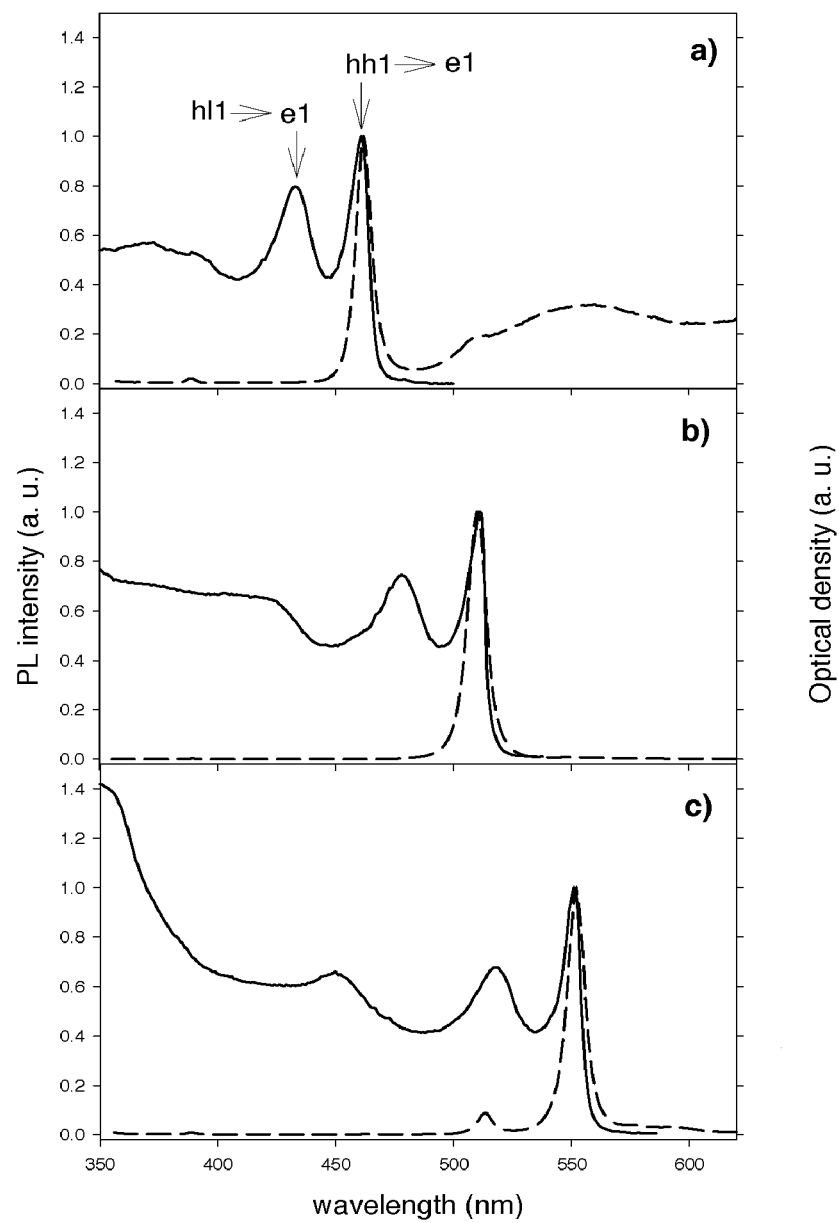
FIG. 3: Emission (dash line) and Photo Luminescent Excitation (solid line) spectra of different platelet syntheses. a) Zinc acetate (cadmium acetate) injected at low temperature (195° C.) and heating at 240° C. for 10 min, b) injection of a big quantity of Cd(Ac)2 at 195° C. and heating at 240° C. for 20 min; and c) same as in a) with a second precursor injection at 240° C. and heating for 20 min.
Figure 4:
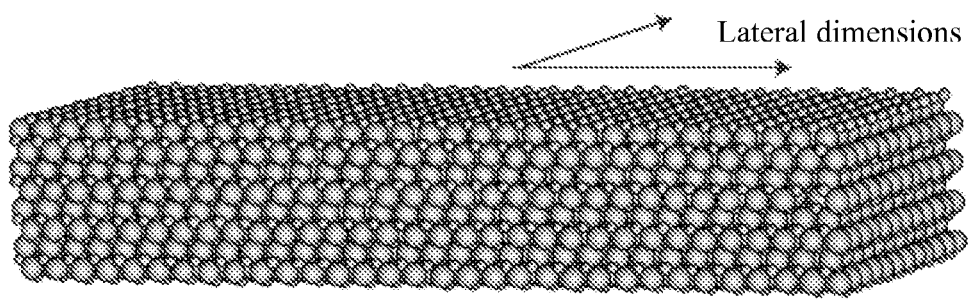
FIG. 4: schematic view of platelets of CdSe obtained with the process of the present invention. This scheme shows clearly what is meant by <<lateral sizes>>.
Figure 5:
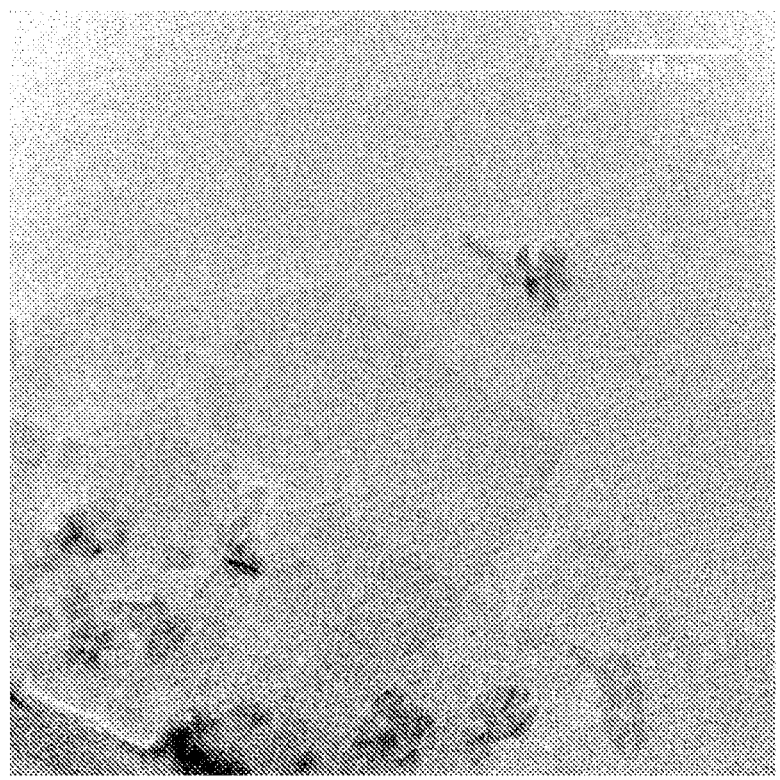
FIG. 5: picture of CdTe synthesized by the process of the present invention. Barre scale: 30 nm.

The main features of the absorption spectra presented in FIG. 2a are also present in the photoluminescent excitation (PLE) spectra (FIG. 3) of three different syntheses yielding in excess population 1, 2, or 3.

For each PLE spectra, both the heavy-hole and the light hole transition for n=1 are clearly visible.

Using Eq. 1 with n=1 with the following numerical values for zinc-blende CdSe: $E_g$=1.67 eV (see Kim, Y. D. et al. Optical-Properties of Zincblende Cdse and Zn(X)Cd(1−X)Se Films Grown on Gaas. Phys Rev B 49, 7262-7270 (1994) [20]), $m_e^*$=0.11 $m_0$ and $m_{hh}^*$=1.14 $m_0$ (Norris, D. J. et al., M. G. Measurement and assignment of the size-dependent optical spectrum in CdSe quantum dots. Phys Rev B 53, 16338-16346 (1996) [21]), the inventors computed the thickness of each platelets population and found d=1.93 nm, 2.24 nm, 2.55 nm. The thinner the platelet, the higher its emission energy. The same operation using the light hole transition and an effective mass of $m_{lh}$=0.31 $m_0$ (see reference [21]) gives thickness of d=1.97 nm, 2.25 nm and 2.54 nm.

The good agreement between the two sets of values confirms the attribution of the light hole and heavy hole transition.

The thickness difference between the three populations is 0.31±0.01 nm, almost exactly half the lattice parameter of zinc-blende CdSe crystals (a=0.608 nm). This suggests that the CdSe platelets synthesized by the inventors have thicknesses quantified by one CdSe mono-layer.

The emission spectra for each platelet population have FWHM<10 nm and the Stokes shift between the first exciton and the platelet emission is <10 meV, in contrast with the large Stokes shifts observed for quantum dots and quantum rods. Such small Stokes shift is characteristic of quantum wells with precisely controlled thickness as disclosed in Bastard, G. et al., M. Low-Temperature Exciton Trapping on Interface Defects in Semiconductor Quantum Wells. Phys Rev B 29, 7042-7044 (1984) [22] and suggests that within a platelet population the thickness is indeed precisely controlled. Using Eq. 1 with n=1, the platelets thicknesses can also be deduced from the emission spectra of FIG. 3 or FIG. 2b, with values identical to the ones computed above because of the absence of significant Stokes shift.

For the thinner platelet population, a first narrow band-gap emission line precedes a large red-shifted emission characteristic of deep trap emission readily observed in small CdSe quantum dots.

As it is the case for quantum wells, the absorption spectra of the platelets (FIG. 2a) has two major peaks that correspond to the heavy hole-electron and light hole-electron transitions for n=1, and one step that is attributed to the heavy hole-electron transition for n=2. These features correspond to the platelet population emitting at 2.42 eV, which, in this case, is the dominant population. The contributions of the other populations are visible as small bumps at 2.25 eV and 2.68 eV.

Based on these optical and structural observations, the inventors propose that the platelet formation occurs through formation of small zinc-blende CdSe seeds followed by extremely rapid precursor reaction mediated by the acetate salt. The platelet thickness seems to be fixed by the size of the CdSe seed.

When the acetate salt is present in the starting solution at room temperature, only large CdSe films emitting mostly at 460 nm are synthesized, and the later the acetate salt is introduced the thicker the platelets.

When the acetate salt is introduced after large CdSe (diameter>3 nm) seeds are formed, the inventors do not see evidence of platelets formation anymore, but extremely large and polydisperse zinc blende CdSe quantum dots are formed. In contrast, re-injection of precursors in a platelets solution does not alter the platelets thickness, but rather modifies the absorption and emission intensity of the different platelets populations already present in solution.

The inventors further assume that the adsorption of the myristate to two parallel facets of the zinc-blende seeds lowers strongly their energy, and that the growth proceeds only perpendicular to these two facets on higher energy surfaces. The smaller the CdSe seed, the faster the lateral platelet extension, indicating that thin edges have higher energy than thicker ones.

The control of the platelet thickness at the atomic level is a "natural" consequence of the growth process, and while the inventors cannot exclude thickness variation in a platelet as in the case of quantum well growth as disclosed in reference [22], the spectroscopic data the inventors have obtained strongly suggest that most of the platelet synthesized have uniform thickness. The crucial role of lead acetate salt in the shape control of PbSe nanocrystals has already been documented, for example in Houtepen, A. J. et al., The hidden role of acetate in the PbSe nanocrystal synthesis. *J Am Chem Soc* 128, 6792-6793 (2006) [23], and the inventors expect that the synthesis the inventors have developed for CdSe nanoplatelets can be generalized to other semiconductor compounds.

Single platelet fluorescence emission is easily visualized using a fluorescent microscope and a mercury lamp as the excitation source. To the eye, they appear as extremely bright source of light with strong blinking and low resistance to photobleaching, as for CdSe quantum dots. It will be interesting to see whether core/shell platelets structure can be synthesized.

Such structures should have increased resistance to photobleaching and reduced blinking as disclosed in Mahler, B. et al. Towards non-blinking colloidal quantum dots. *Nature Materials* 7, 659-664 (2008) [24]. They would be the equivalent of quantum wells heterostructures. However, lattice mismatch between the core and the shell will induce mechanical constraints as disclosed in Vandermerwe, J. H. Crystal Interfaces 0.2. Finite Overgrowths. *J Appl Phys* 34, 123-& (1963) [25] on the platelets that could result in buckling and twisting.

Colloidal platelets with thickness tuneable at the atomic level and controlled lateral dimensions should be useful to test the predictions made for 2D quantum boxes as disclosed in Bryant, G. W., Excitons in Quantum Boxes—Correlation-Effects and Quantum Confinement. *Phys Rev B* 37, 8763-8772 (1988) [26]. For example, the oscillator strength of platelets is predicted to increase strongly as the lateral confinement of the exciton increases.

This phenomenon has been observed in CuCl as disclosed in Nakamura, A. et al., Size-Dependent Radiative Decay of Excitons in Cucl Semiconducting Quantum Spheres Embedded in Glasses. *Phys Rev B* 40, 8585-8588 (1989) [27] quantum dots but not in quantum platelets yet.

This enhanced oscillator strength gives rise to interesting non-linear properties as disclosed in Chemla, D. S. & Miller, D. A. B. Room-Temperature Excitonic Nonlinear-Optical Effects in Semiconductor Quantum-Well Structures. *J. Opt. Soc. Am. B-Opt. Phys.* 2, 1155-1173 (1985) [28] and may be applied with these colloidal platelets to make effective non linear optical device. The growth of multiple quantum wells lead to the development of several applications including quantum cascade lasers as disclosed in Faist, J. et al. Quantum Cascade Laser. *Science* 264, 553-556 (1994) [29].

The inventors think that stacking of platelets could lead to similar devices, especially if core/shell platelets can be synthesized and electrically coupled.

Example 4

Manufacture of a CdS Material According to the Present Invention

The CdS platelets.

In a three neck flask 170 mg of Cd(myristate)$_2$ (0.3 mmol), 55 mg of Zn(Ac)$_2$ (0.3 mmol), 1.5 ml of SODE at 0.1M (0.15 mmol) and 13.5 ml of octadecene were introduced and degassed under vacuum for 30 minutes. Then the mixture was heated at 180° C. under Argon flow for 10 minutes. Then the nanocrystals are precipitated in ethanol and suspended in hexane.

They are not soluble in hexane.

Example 5

Manufacture of a CdTe Material According to the Present Invention

In a three neck flask 400 mg of Cd(acetate)$_2$ XH$_2$O, 150 microliter of oleic acid and 10 ml of octadecene were introduced and degassed under vacuum for 30 minutes at 100° C. Then the mixture was heated at 150° C. under Argon flow and 150 microliter TOPTe (TOP=trioctylphosphine) 1M were injected. React for 10 minutes at 180° C. After removing the heating mantle and going back to room temperature, the nanocrystals were precipitated in ethanol and suspended in hexane or THF.

Example 6

Examples of Manufacture of CdSe with Octadecene (ODE=Octadecene)

1) Cd(myristate)$_2$, Se mesh and ODE were introduced in a degassed container and heated up to temperature of 240° C.; when the temperature reached 190° C., the acetate salt, for example Zn(Ac)$_2$, Cd(Ac)$_2$,xH$_2$O or Mn(Ac)$_2$,xH$_2$O was introduced. Depending on the proportions, platelets that emit with maxima at 460 nm, 510 nm or 550 nm were obtained.

2) Cd(myristate)$_2$, Se mesh, acetate salt, for example Zn(Ac)$_2$, Cd(Ac)$_2$,xH$_2$O or Mn(Ac)$_2$,xH$_2$O, and ODE were introduced in a degassed container. Heating at a temperature of from 180° C. to 240° C.

3) Cd(acetate)$_2$, oleic acide and ODE in a degassed container, with heating and intensive agitation. Temperature of 170° C., and introducing TOPSe. Reanneal at 220° C. allows to reduce the deep trap.

4) Se mesh, oleic acid and ODE in a degassed container. Temperature of 240° C. and adding Cd(Ac)$_2$. Reannealing 20 minutes at 240° C. Thick platelets are obtained.

5) Cd Acetate, selenium mesh and ODE were introduced in a degassed container, with heating and intensive agitation. Temperature of 170° C., and introducing Oleic acid. Reanneal at 220° C. allows to reduce the deep trap.

Example 7

Lateral Growth of CdSe Platelets

CdSe platelets were synthesized according to example 1. At the end of the synthesis and once the content of the flask was cooled, 1 ml of oleic acid and hexane were injected and then mixture was centrifuged. The supernatant containing the quantum dots was eliminated and the precipitate was suspended in hexane. Each time the medium was cloudy, it was centrifuged and the platelets were recovered from the supernatant. This process was carried out several times in order to recover a maximum amount of platelets emitting at 510 nm. The insoluble portion seemed to be the excess of Cd(myr).

The platelets were suspended again in 10 mL of hexane.

3 mL of a solution of CdSe platelets, 3 mL of ODE, 28 mg (0.15 mmol) of Zn(Ac)$_2$, and 43 mg (0.075 mmol) of Cd(myr) 2, were introduced in a round bottom flask. The flask was degassed at room temperature (20° C.) and then put under Argon.

The temperature was set at 200° C. 3.5 mL of trioctylamine, 43 mg of Cd(myr)$_2$ and 1.5 mL of SeODE at 0.1M were injected by a seringe at a rate of 3 ml/h. Prior to the injection, the mixture of trioctylamine and Cd(myr)$_2$ was heated in order to solubilize Cd(myr)$_2$.

This additional post-synthetic step allows the platelets to continue growing laterally in solution after their synthesis. It is a proof that platelets, with controlled thicknesses tuned at atomic level, with dimensions up to a meter or more may be synthesized.

REFERENCES

[1] Yin, Y. & Alivisatos, A. P. Colloidal nanocrystal synthesis and the organic-inorganic interface. *Nature* 437, 664-670 (2005).
[2] Hu, J. T., Odom, T. W. & Lieber, C. M. Chemistry and physics in one dimension: Synthesis and properties of nanowires and nanotubes. *Accounts Chem Res* 32, 435-445 (1999).
[3] Geim, A. K. & Novoselov, K. S. The rise of graphene. *Nature Materials* 6, 183-191 (2007).
[4] Murray, C. B., Norris, D. J. & Bawendi, M. G. Synthesis and Characterization of Nearly Monodisperse Cde (E=S, Se, Te) Semiconductor Nanocrystallites. *J Am Chem Soc* 115, 8706-8715 (1993).
[5] Duan, X. F. & Lieber, C. M. General synthesis of compound semiconductor nanowires. *Adv Mater* 12, 298-302 (2000).
[6] Peng, X. G. et al. Shape control of CdSe nanocrystals. *Nature* 404, 59-61 (2000).
[7] Weisbuch, C. & Vinter, B. Quantum Semiconductor Structures: fundamentals and applications. (Academic Press, 1991).
[8] Morales, A. M. & Lieber, C. M. A laser ablation method for the synthesis of crystalline semiconductor nanowires. *Science* 279, 208-211 (1998).
[9] Jun, Y. W., Choi, J. S. & Cheon, J. Shape control of semiconductor and metal oxide nanocrystals through non-hydrolytic colloidal routes. *Angew Chem Int Edit* 45, 3414-3439 (2006).
[10] Michalet, X. et al. Quantum dots for live cells, in vivo imaging, and diagnostics. *Science* 307, 538-544 (2005).
[11] Hines, M. A. & GuyotSionnest, P. Synthesis and characterization of strongly luminescing ZnS— Capped CdSe nanocrystals. *J Phys Chem-Us* 100, 468-471 (1996).
[12] Redl, F. X., Cho, K. S., Murray, C. B. & O'Brien, S. Three-dimensional binary superlattices of magnetic nanocrystals and semiconductor quantum dots. *Nature* 423, 968-971 (2003).
[13] Caruge, J. M., Halpert, J. E., Wood, V., Bulovic, V. & Bawendi, M. G. Colloidal quantum-dot light-emitting diodes with metal-oxide charge transport layers. *Nat. Photonics* 2, 247-250 (2008).
[14] Puntes, V. F., Zanchet, D., Erdonmez, C. K. & Alivisatos, A. P. Synthesis of hcp-Co nanodisks. *J Am Chem Soc* 124, 12874-12880 (2002).
[15] Xu, R., Xie, T., Zhao, Y. G. & Li, Y. D. Single-crystal metal nanoplatelets: Cobalt, nickel, copper, and silver. *Cryst. Growth Des.* 7, 1904-1911 (2007).
[16] Si, R., Zhang, Y. W., You, L. P. & Yan, C. H. Rare-earth oxide nanopolyhedra, nanoplates, and nanodisks. *Angew Chem Int Edit* 44, 3256-3260 (2005).
[17] Sigman, M. B. et al. Solventless synthesis of monodisperse Cu2S nanorods, nanodisks, and nanoplatelets. *J Am Chem Soc* 125, 16050-16057 (2003).
[18] Ghezelbash, A., Sigman, M. B. & Korgel, B. A. Solventless synthesis of nickel sulfide nanorods and triangular nanoprisms. *Nano Letters* 4, 537-542 (2004).
[19] Yang, Y. A., Wu, H. M., Williams, K. R. & Cao, Y. C. Synthesis of CdSe and CdTe nanocrystals without precursor injection. *Angew Chem Int Edit* 44, 6712-6715 (2005).
[20] Kim, Y. D. et al. Optical-Properties of Zincblende Cdse and Zn(X)Cd(1−X)Se Films Grown on Gaas. *Phys Rev B* 49, 7262-7270 (1994).
[21] Norris, D. J. & Bawendi, M. G. Measurement and assignment of the size-dependent optical spectrum in CdSe quantum dots. *Phys Rev B* 53, 16338-16346 (1996).
[22] Bastard, G., Delalande, C., Meynadier, M. H., Frijlink, P. M. & Voos, M. Low-Temperature Exciton Trapping on Interface Defects in Semiconductor Quantum Wells. *Phys Rev B* 29, 7042-7044 (1984).
[23] Houtepen, A. J., Koole, R., Vanmaekelbergh, D. L., Meeldijk, J. & Hickey, S. G. The hidden role of acetate in the PbSe nanocrystal synthesis. *J Am Chem Soc* 128, 6792-6793 (2006).
[24] Mahler, B. et al. Towards non-blinking colloidal quantum dots. *Nature Materials* 7, 659-664 (2008).
[25] Vandermerwe, J. H. Crystal Interfaces 0.2. Finite Overgrowths. *J Appl Phys* 34, 123-& (1963).
[26] Bryant, G. W. Excitons in Quantum Boxes—Correlation-Effects and Quantum Confinement. *Phys Rev B* 37, 8763-8772 (1988).
[27] Nakamura, A., Yamada, H. & Tokizaki, T. Size-Dependent Radiative Decay of Excitons in Cucl Semiconducting Quantum Spheres Embedded in Glasses. *Phys Rev B* 40, 8585-8588 (1989).
[28] Chemla, D. S. & Miller, D. A. B. Room-Temperature Excitonic Nonlinear-Optical Effects in Semiconductor Quantum-Well Structures. *J. Opt. Soc. Am. B-Opt. Phys.* 2, 1155-1173 (1985).

[29] Faist, J. et al. Quantum Cascade Laser. *Science* 264 (5158), 553-556 (1994).
[30] Han, M. Y., Gao, X. H., Su, J. Z. & Nie, S. Quantum-dot-tagged microbeads for multiplexed optical coding of biomolecules. *Nat Biotechnol* 19, 631-635 (2001).
[31] Y. Wu, C. Wadia, W. L. Ma, B. Sadtler, A. P. Alivisatos, Nano Letters 8, 2551 (August, 2008).
[32] D. Todorovsky et al., Journal of the University of Chemical Technology and Metallurgy, 41, 1, 2006, 93-96.

The invention claimed is:

1. A colloidal material, comprising:
    semiconductor nanocrystals of formula AnXm which luminesce, the nanocrystals being in the form of nano-platelets, and
    wherein the full width half maximum (FWHM) of the fluorescence emission line is inferior or equal to 10 nm at room temperature, and
    wherein:
    X is an element selected from groups V or VI of the periodic table;
    A is an element selected from groups II, IIb, III or IV of the periodic table;
    n and m are such that AnXm is a neutral compound.

2. The colloidal material of claim 1, wherein the semiconductor nanocrystals are selected from the group consisting of a II-VI, IV-VI and III-V semiconductor.

3. The colloidal material according to claim 1, wherein AnXm is a compound selected from the group consisting of CdSe, CdS, CdTe, CuInSe, CuInS2 InP, InAs, InSb, PbSe and PbS.

4. The colloidal material of claim 1, wherein the nanocrystals are quasi 2D semiconductor nanocrystals.

5. The colloidal material of claim 1, wherein the nanocrystals are quasi-2D AnXm nanocrystals with the thickness quantified by an AnXm monolayer.

6. The colloidal material of claim 5, wherein the quasi-2D AnXm nanocrystals are quasi-2D CdSe nanocrystals and the AnXm monolayer is a CdSe monolayer.

7. The colloidal material of claim 1, wherein the nanocrystals have a thickness which is tuned at the atomic level.

8. The colloidal material of claim 1, wherein the nanocrystals have lateral sizes between 10 nm and a few hundred nm, lateral sizes are the length and/or the width of the nanoplatelets.

9. The colloidal material of claim 1, wherein the nanocrystals have a thickness less or equal to 10 nm.

10. The colloidal material according to claim 2, wherein AnXm is a compound selected from the group consisting of CdSe, CdS, CdTe, CuInSe, CuInS2 InP, InAs, InSb, PbSe and PbS.

* * * * *